(12) United States Patent
Montillo et al.

(10) Patent No.: US 6,647,132 B1
(45) Date of Patent: Nov. 11, 2003

(54) METHODS AND APPARATUSES FOR IDENTIFYING REGIONS OF SIMILAR TEXTURE IN AN IMAGE

(75) Inventors: Albert A. Montillo, Philadelphia, PA (US); Ivan A. Bachelder, Newton, MA (US)

(73) Assignee: Cognex Technology and Investment Corporation, Mt. View, CA (US)

(*) Notice: Subject to any disclaimer, the term of this patent is extended or adjusted under 35 U.S.C. 154(b) by 0 days.

(21) Appl. No.: 09/457,825

(22) Filed: Dec. 9, 1999

Related U.S. Application Data
(60) Provisional application No. 60/147,646, filed on Aug. 6, 1999.

(51) Int. Cl.[7] ................................................. G06K 9/00
(52) U.S. Cl. ...................................... 382/108; 382/146
(58) Field of Search ................................. 382/108, 146, 382/111, 204, 205, 176, 191, 280; 345/582; 348/128

(56) References Cited

U.S. PATENT DOCUMENTS

| | | | | |
|---|---|---|---|---|
| 3,573,612 A | * | 4/1971 | Scarr | 324/617 |
| 4,876,457 A | | 10/1989 | Bose | 250/563 |
| 5,224,175 A | * | 6/1993 | Gouge et al. | 382/128 |
| 5,299,269 A | | 3/1994 | Gaborski et al. | 382/9 |
| 5,341,439 A | * | 8/1994 | Hsu | 382/103 |
| 6,011,862 A | * | 1/2000 | Doi et al. | 382/132 |
| 6,087,182 A | * | 7/2000 | Jeng et al. | 436/66 |
| 6,249,598 B1 | * | 6/2001 | Honda et al. | 382/150 |
| 6,459,278 B1 | * | 10/2002 | Knox | 324/76.17 |

OTHER PUBLICATIONS

Shishir Shah et al., "A Bayesian Segmentation Framework for Textured Visual Images", in Proc. of IEEE computer Society Conference on computer Vision and Pattern Recognition, pp. 1014–1020, Jun. 17–19, 1997.*

H. Arof et al., "Circular neighbourhood and 1–D DFT features for texture classification and segmentation", Vision, Image, and Signal Processing –IEEE proceedings, Jun. 3, 1998, vol.: 145 Issue, pp. 167–172.*

Terry Caelli, Three processing characteristics of visual texture segmentation, Spatial Vision, vol. 1. pp. 19–30, VNU Science Press; 1985.

Harry Voorhees and Tomaso Poggio, Dectecting Textons and Texture Boundaries in Natural Images, Massachusetts Institue of Technology, Artificial Intelligence Laboratory, Cambridge, MA.

(List continued on next page.)

*Primary Examiner*—Brian Werner
*Assistant Examiner*—Ryan J. Miller
(74) *Attorney, Agent, or Firm*—Tracy Calabresi

(57) ABSTRACT

Methods and apparatuses are disclosed for identifying regions of similar texture in an image. The areas of similar texture include areas conventionally thought of as similar texture regions as well as areas of more varied texture that are treated as regions of similar texture in order to identify them within an image. The method associates frequency characteristics of an image with a spatial position within the image by: applying a frequency analysis on sub-regions of the image, thereby, generating frequency characteristics representative of the sub-regions: and associating the frequency characteristics with the origin of the sub-regions. An embodiment disclosed applies a fast Fourier transform on sub-regions in a given direction to determine a dominant frequency of the sub-region and the power of the dominant frequency, both of which are associated with the respective sub-region by storing the dominant frequency and power in a frequency image and power image, respectively, at the position of the origin. Thereafter, the frequency image and the power image are segmented to generate binary images containing regions having similar frequencies and powers, respectively. The binary images are then logically anded together to further refine the regions possessing similar frequency, and thereby finding regions having similar texture in an image.

38 Claims, 13 Drawing Sheets

OTHER PUBLICATIONS

Andrew P. Witkin, Recovering Surface Shape and Orientation from Texture, Artificial Intelligence, pp. 17–15, 1981.

B. Julesz and J.R. Bergen, Textons, The fundamental Elements in Preattentive Vision and Preception of Textures; Human Factors and Behavioral Science, Morgan Kaufmann Publishers, Inc., 1981.

Jacob Beck, K. Prazdny, Azriel Rosenfeld, A Theory of Textural Segmentation, Human and Machine Vision, pp. 1–38, Academic Press, Inc. 1983.

Jacob Beck, Textural Segmentation, Second-Order Statistics, and Textural Elements, Chapter 48, pp. 125–130, 1983.

B. Julesz and J.R. Bergen, Textons, The Fundamental Elements in Preattentive Vision and Perception of Textures, The Bell System Technical Journal, vol. 62, No. 6, Jul.–Aug. 1983.

H. Tropf, Analysis by Synthesis search for semantic segmentation Applied to Workpiece Recognition, IEEE. $5^{th}$ International Conference on Pattern Recognition. vol. 1 of 2, pp. 242–244; 1980.

Rafael C. Gonzalez, Digital Image Processing, Chapter 1—Digital Image Processing; Chapter 7, Image Segmentation & Description. Addison–Wesley Publishing Company, Advanced Book Program, 1977.

Hyun–Taek Chang and Minsoo Suk, Efficient Polygonal Decomposition of Segmented Images, IEEE Computer Society Conference on Computer vision and Pattern Recogntion; 1985.

\* cited by examiner

METHODS AND APPARATUSES FOR IDENTIFYING REGIONS OF SIMILAR TEXTURE IN AN IMAGE

This application claims the benefit of U.S. Provisional Application No. 60/147,646, filed Aug. 6, 1999.

FIELD OF THE INVENTION

This invention relates to machine vision, and particularly to methods and apparatuses for processing images.

BACKGROUND

Many machine-vision applications identify regions of images and process the image data within the regions instead of processing the entire image. Regions are segmented using many different vision tools. For instance, growing a region, applying a connectivity analysis, or applying a boundary-tracking algorithm segments regions from an image. The optimal vision tool for a given application depends upon the region being identified and the imaging environment present.

As known in the art, segmenting a region is a difficult machine-vision task. For example, segmenting leads within an image of a leaded device is difficult, where a leaded device is an electronic component that has a device body and metal leads. Leaded devices include surface-mount components and through-hole components, for example. One way to segment the leads is to binarize the image of the leaded device. Binarizing an image is a technique that chooses a threshold value to segment the image into foreground objects and background. Typically, one intensity, such as white, denotes the leads, and the other intensity, such as black, denotes the image background (the background and the device body). One of the short falls of the binarization technique is the inability of a single threshold value to segment the entire lead from the image background and the device body. The leads have specularly reflecting surfaces that frustrate identifying an appropriate threshold value to segment the leads within a front-lit image of the leaded device. The leads also cannot be segmented with one threshold value from within back-lit images, because in back-lit images the leads and the device body have substantially the same grey-scale value. Therefore, no threshold value exists that segments the entire lead relative to the body and background. Thus, the binarization method is not an optimal solution to segment leads.

The same shortfalls arise when trying to segment balls of a ball grid array (BGA) device, where a BGA device is a surface mount device consisting of a approximately rectangular body package and a grid of metal balls.

Therefore, binarization is typically combined with other techniques, such as morphology, for example, to segment leads or balls. Morphology works best when features in the image that belong together are closest together, because the closest features become one region after applying morphology. When leads are imaged, the specularly reflecting surfaces typically cause opposed ends of the leads to appear as bright features in the image, while other areas of the lead remain unclear in the image. The features closest together are the ends of adjacent leads. Therefore, applying morphology produces a region containing the ends of the adjacent leads, which, unfortunately, is not the region desired to be segmented. Therefore, binarization combined with morphology is also not an optimal solution to segment leads.

A region can also be segmented by capitalizing on its inherent properties, such as the texture of the region. Typically, textured regions are segmented using nth-order statistics or textons. Nth-order statistics segment regions that have large enough statistical differences. Therefore, only significantly different regions are segregated by nth order statistics. Further, applications applying nth-ordered statistics segmenting suffer the same problems as other segmentation algorithms: the algorithm has to choose the correct measure (e.g. the correct statistics) to properly identify the right local area. Alternatively, textons, which are local profiles, are used to find textured regions in an image. Textons, however, cannot easily pick up lower frequency texture.

SUMMARY

Methods and apparatuses are disclosed for identifying regions of similar texture in an image.

More particularly, the method acquires image data representing the at least one input image and divides at least a portion of the image data into sub-regions, where each of the sub-regions has an origin.

The frequency characteristic(s) for the sub-regions are determined by applying a frequency analysis, such as applying a Fourier transform in one or more orientations. The frequency characteristic(s) of each sub-regions at each orientation is associated with the origin of each of the sub-regions, and thus, with the spatial position of the sub-region within the image.

Then, the frequency characteristic(s) of each of the sub-regions is examined to identify similar sub-regions, thereby identifying regions of similar texture in the input image.

In one embodiment, the frequency characteristic is examined by first representing the frequency characteristic of each of the sub-regions as a value on a frequency-characteristic image at the respective origin of each of the sub-regions and segmenting the similar sub-regions within the frequency-characteristic image using the values of the sub-regions. The regions within the frequency characteristic image are regions of similar texture, but the regions can have different texture from one another.

The invention recognizes, among others, that regions of similar texture display at least one similar frequency characteristic that can be used to segment the regions of similar texture.

Further, the invention recognizes, among others, that the frequency characteristic(s) of an image can be associated with the respective spatial position within the image. Specifically, the invention applies a frequency analysis on a sub-region of the image to generate a frequency characteristic(s) and associates that frequency characteristic(s) with the origin of the sub-region. Using the spatial positions of the frequency characteristics, the invention identifies regions of similar texture in an image.

In another embodiment, more than one frequency characteristic is used to identify the regions. Specifically, each frequency characteristic, for the sub-regions, is stored as an image, as hereinbefore described. Then, the images are combined. In one embodiment, the images are combined by logical anding, which only maintains portions of a region that are within every one of the frequency characteristic images. Thus, the boundary of the region is refined.

In another embodiment, more than one frequency characteristic is also used, but additionally the frequency characteristics images are thresholded to create binary images. Thereafter, at least one of the binary images for one of the frequency characteristics is combined with one of the binary images for another one of the frequency characteristics to again refine the regions of similar texture. In a preferred embodiment, all variations of combining the binary images are performed. Further, in a preferred embodiment, the binary images are combined by logically anding the binary images.

In further aspects, the invention also recognizes that leads of a leaded device or balls of a BGA device will produce a homogeneous frequency, and therefore, can be segmented from an image as described herein.

The invention is particularly useful for segmenting lead sets from an image of a leaded device or segmenting ball regions from an image of a BGA device.

Among other advantages, the invention can segment regions having textures that are typically not classified as similar textures.

The invention solves some of the problems of the prior art, including but not limited to, segmenting lead sets and balls from an image, segmenting regions that do not have an easily identifiable threshold value, but that exhibit similar frequency characteristics, and segmenting low frequency elements using a form of texture segmentation.

In further aspects, the invention provides apparatuses in accord with the methods described above. The aforementioned and other aspects of the invention are evident in the drawings and in the description that follows.

BRIEF DESCRIPTION OF DRAWINGS

The invention will be more fully understood from the following detailed description, in conjunction with the accompanying figures, wherein.

DETAILED DESCRIPTION

The methods and apparatuses identify at least one region having similar texture in an image. The method is particularly useful for locating leads of a leaded device. Though this is the form of a preferred embodiment, this embodiment should be considered illustrative, and not restrictive.

Figure 1:
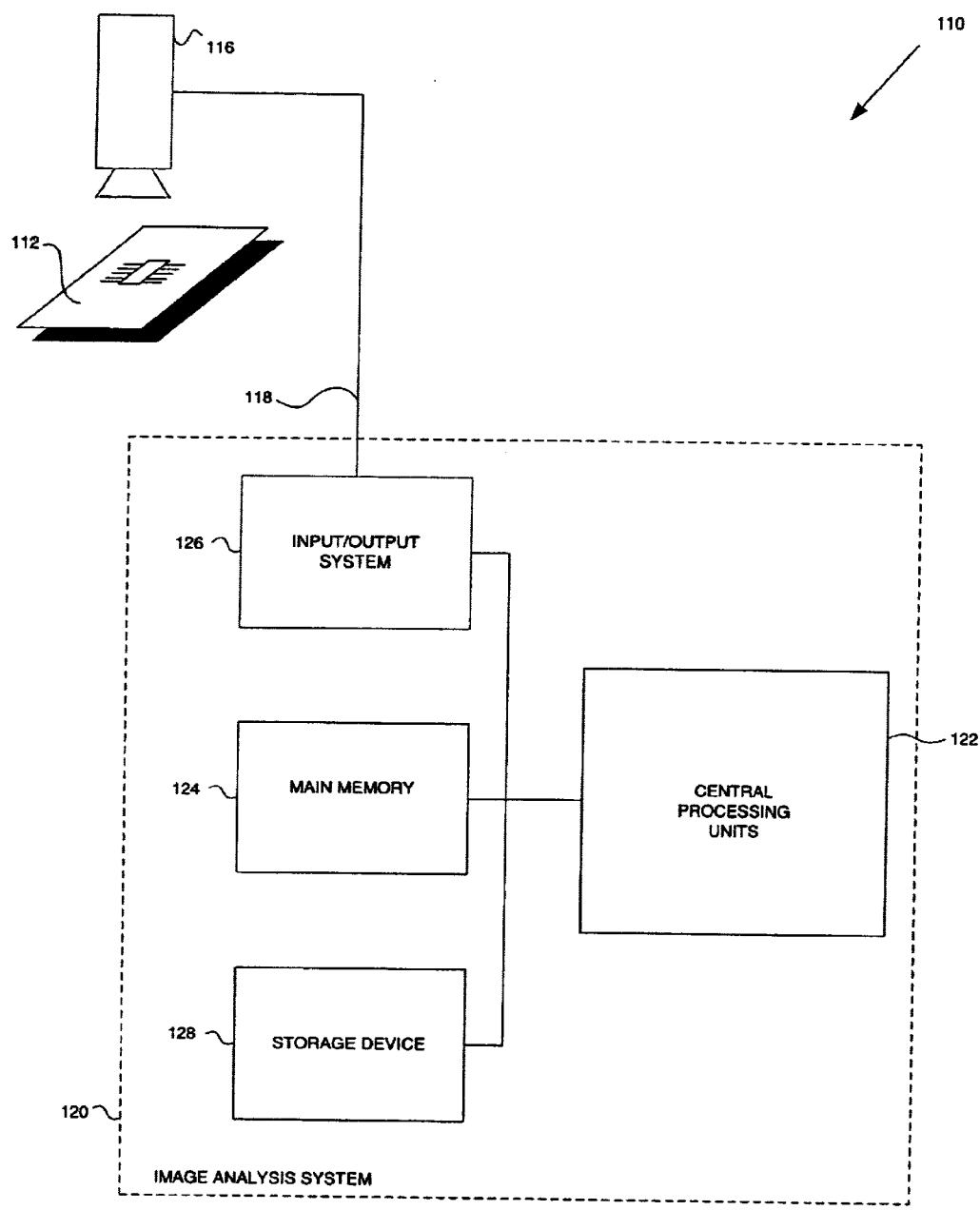
FIG. 1 depicts a machine vision system for practice of the invention.

FIG. 1 illustrates a machine system 110 of the type in which the invention is practiced. The system 110 includes a capturing device 116, such as a conventional video camera or scanner that generates an image of an object 112. Image data (or pixels) generated by the capturing device 116 represent, in the conventional manner, the image intensity (e.g. color or brightness) of each point in the scene at the resolution of the capturing device 116.

The digital image data is transmitted from the capturing device 116 via a communications path 118 to an image analysis system 120. This can be a conventional digital data processor, or a vision processing system of the type commercially available, for example, from the assignee hereof, Cognex Corporation, programmed in accord with the teachings hereof to identify regions having similar texture from the image data.

The image analysis system 120 may have one or more central processing units 122, main memory 124, input-output system 126, and one or more disc drives (or other mass storage device) 128, all of the conventional type.

The system 120 and, more particularly, central processing unit 122, is configured by programming instructions according to the teaching hereof to identify regions of similar texture in the image, as described in further detail below. Those skilled in the art will appreciate that, in addition to implementation on a programmable digital data processor, the methods and apparatuses taught herein can be implemented in special purpose hardware.

As known in the art, many different objects and features have texture, such as a screen, for example. The objects 202 and 204, depicted in FIG. 2, not drawn to scale, have features (i.e., the concentric outlines) that have similar texture along the radial direction. The blinds 206 also exhibit similar texture. Substantially defect-free areas of a web of material (not shown) also exhibit a similar texture, where the defective areas exhibit a texture different from that of the background (i.e., the majority of the web of material).

The invention can identify regions of similar texture from within regions of non-similar texture. For example,. the portions of the print strokes of the logo 228 that share the direction 230 create a region of similar texture. This region is identified although it is among portions of the print strokes that are in a different direction than the texture. The entire object does not have to possess similar texture to be identified using the invention. The invention can identify one portion of an object having a similar texture, where the portion can be segregated in one area of the object or throughout the object.

It should also be apparent that multiple objects and not just features of objects can create the texture.

Balls 212 of a BGA device 218, wide leads 208, and thin leads 210 of a leaded device 216 also create regions of similar texture, that are identified from within the image, even though the images have backgrounds 220 and 222 with a faint texture from the partially occluded circular object 224 and 226, respectively. Typically, the size of, and/or the spacing between, leads and/or groups of leads or balls is substantially uniform, where the degree of uniformity is known in the art. The uniformity produces regions of similar texture.

Figure 3:
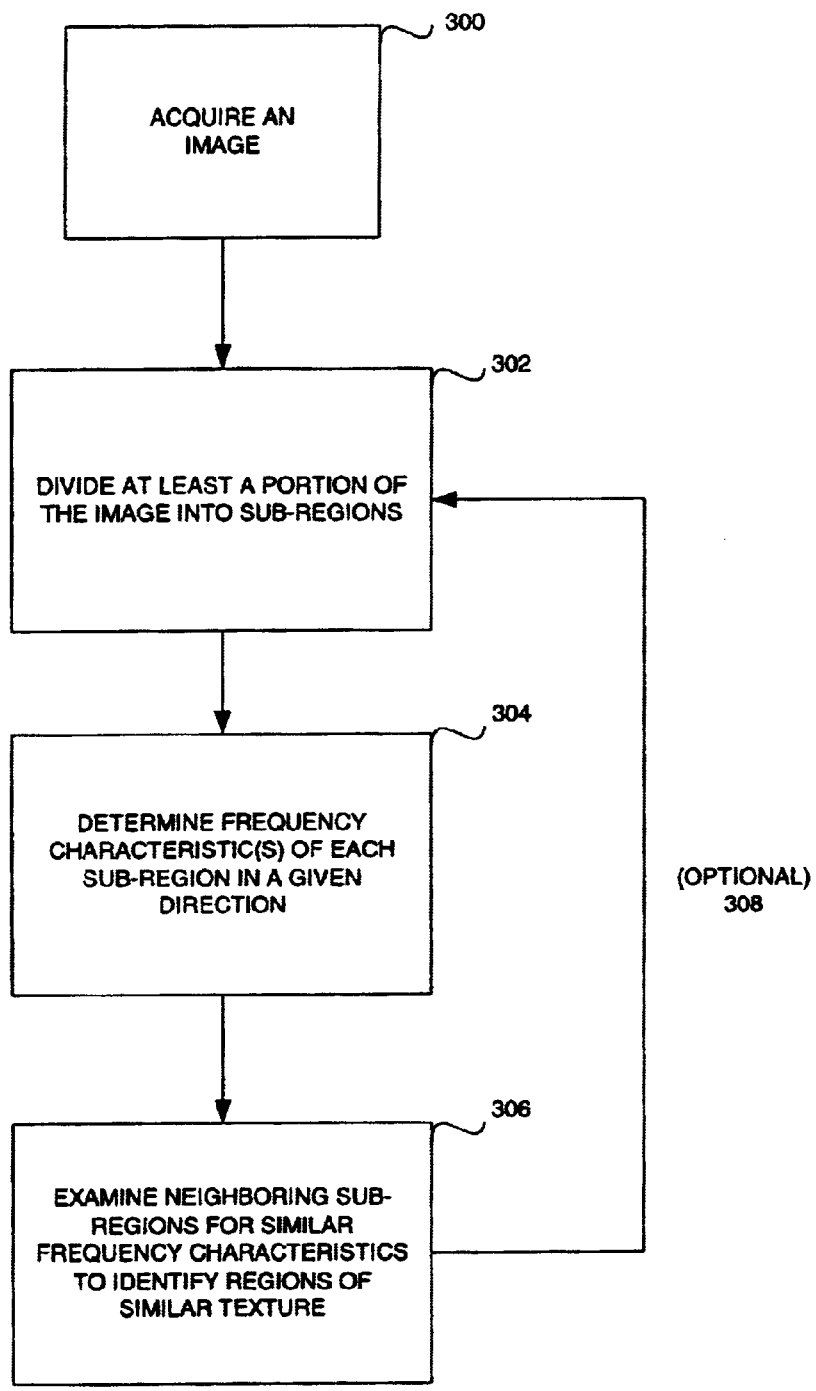
FIG. 3 is a flowchart summarizing operation of an embodiment of a method according to the invention that identifies regions of similar texture in an image.

Objects without uniform size and/or spacing between features or one another also have regions of similar texture, such as the bar code 232, as described more fully with respect to FIG. 3. The bar code 232 exhibits a similar texture that is identified and used to segment the entire bar code 232 as a region within an image. The bar code features 234 have different widths, and may not in the traditional sense have similar texture, but as used herein similar texture includes objects and features that can be identified using the methods and apparatuses described herein.

Turning to FIG. 3, FIG. 3 is a flowchart summarizing operation of an embodiment of a method according to the invention that identifies regions of similar texture in an image, where steps of the method will be denoted in the detailed description in parentheses. The first step is to acquire an image (300). Next, at least a portion of the image is divided into sub-regions (302), which are analyzed for frequency characteristic(s) (304), as hereinafter described.

Figure 4:
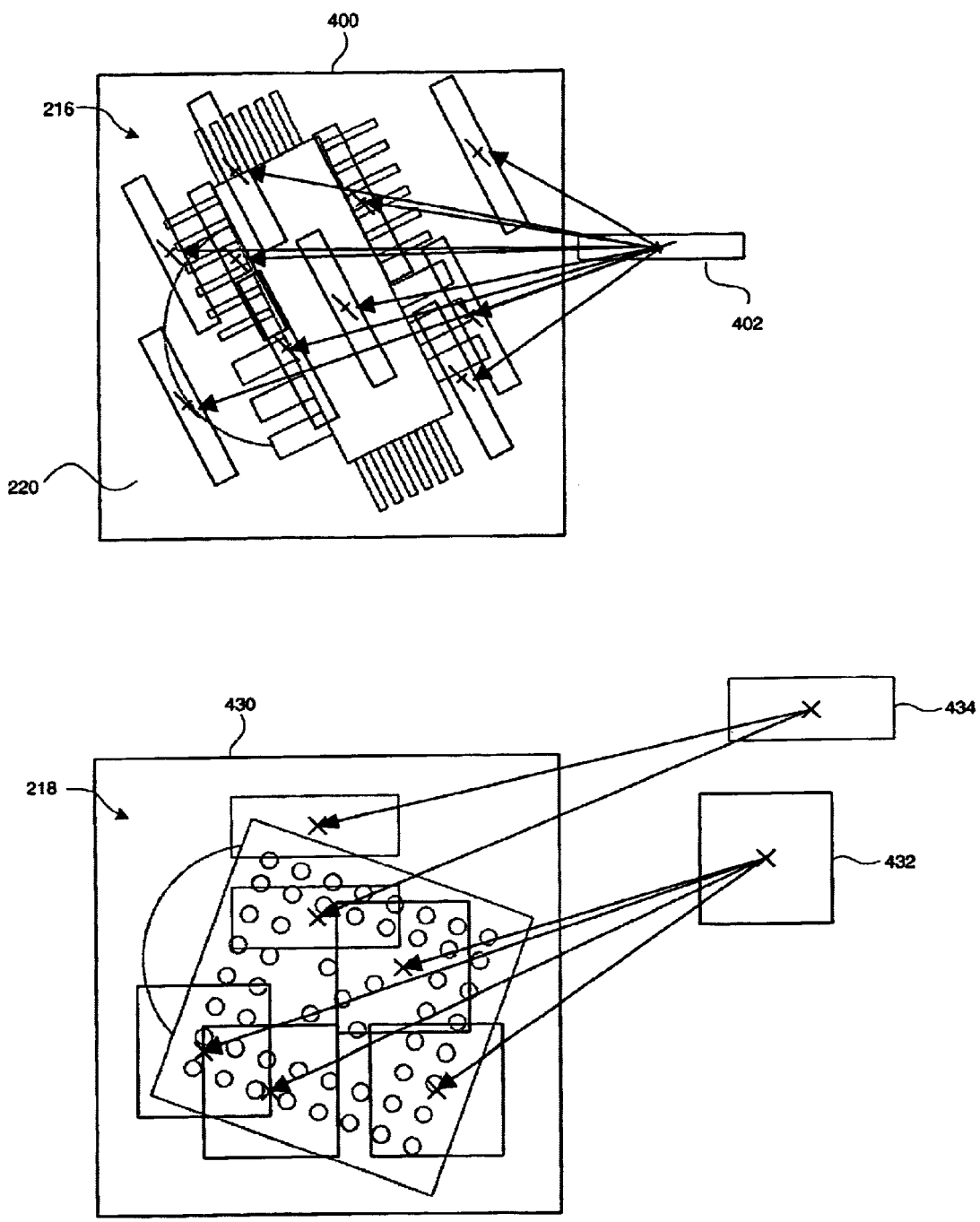
FIG. 4 depicts various examples of sub-regions into which an image can be divided.
Figure 4:
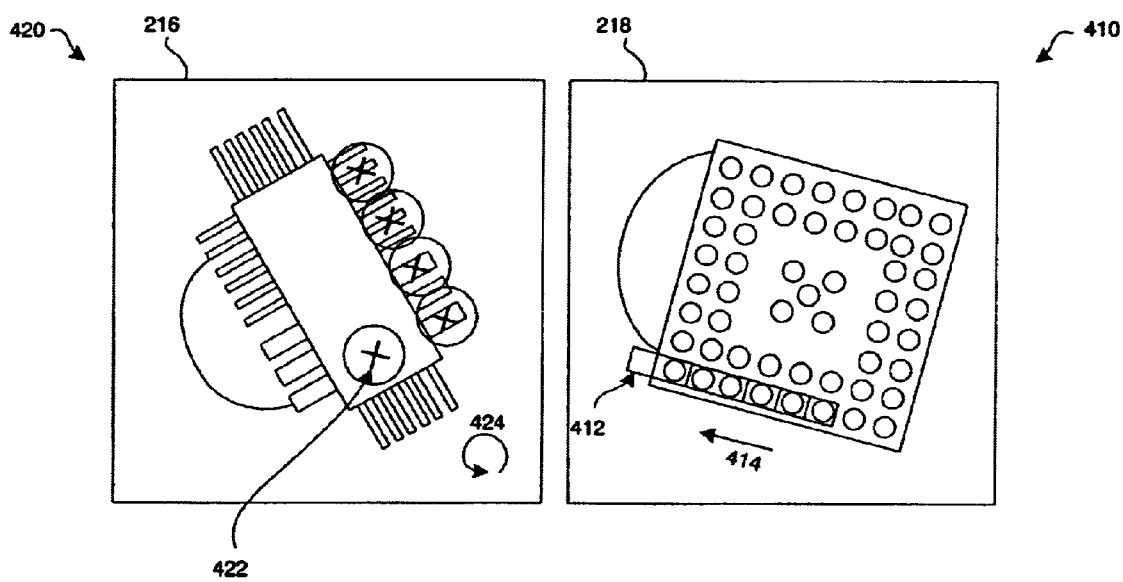

The analysis associates one or more frequency characteristics with the origin of each sub-region. For example, as shown in FIG. 4, not drawn to scale, the frequency characteristic(s) of the image within each of the sub-regions 402 is associated with the position of the sub-regions origin denoted by an "X" in the image 400, where like numerals designate like elements.

Preferably, the sub-regions, and therefore, the origins thereof, are spaced at regular intervals to facilitate reconstructing a representation of the image using the frequency characteristic(s) measured at each origin. Image 410 depicts an example of the BGA 218 having sub-regions 412 spaced at regular intervals, and image 400 shows an example of the leaded device 216 having sub-regions 422 spaced at regular intervals. In a preferred embodiment, the sub-regions are spaced such that the centers of neighboring sub-regions correspond to neighboring pixels in the image (i.e., every pixel location in the image is an origin for a sub-region). As should be apparent to one skilled in the art, when the sub-regions are not spaced at regular intervals, a map of the spacing used is kept from which the spatial relationship of the sub-regions and the associated frequency characteristic(s) are later reconstructed.

All the sub-regions within one given image do not have to be the same shape, as shown in image 430, which has square sub-regions 432 and rectangular sub-regions 434. The sub-regions can have various shapes, such as the circular sub-regions 422 of image 420, the square sub-regions 432 of image 430, or the rectangular sub-regions 402 and 412 of images 400 and 410, respectively, for example.

The optimum size of the sub-regions is application specific. If the sub-region is too large or too small for the image, the frequency characteristic(s) generated therefrom fail to appropriately represent the sub-region. For instance, if the sub-region is too small, frequency characteristics may be missed due to aliasing affects.

Figure 2:
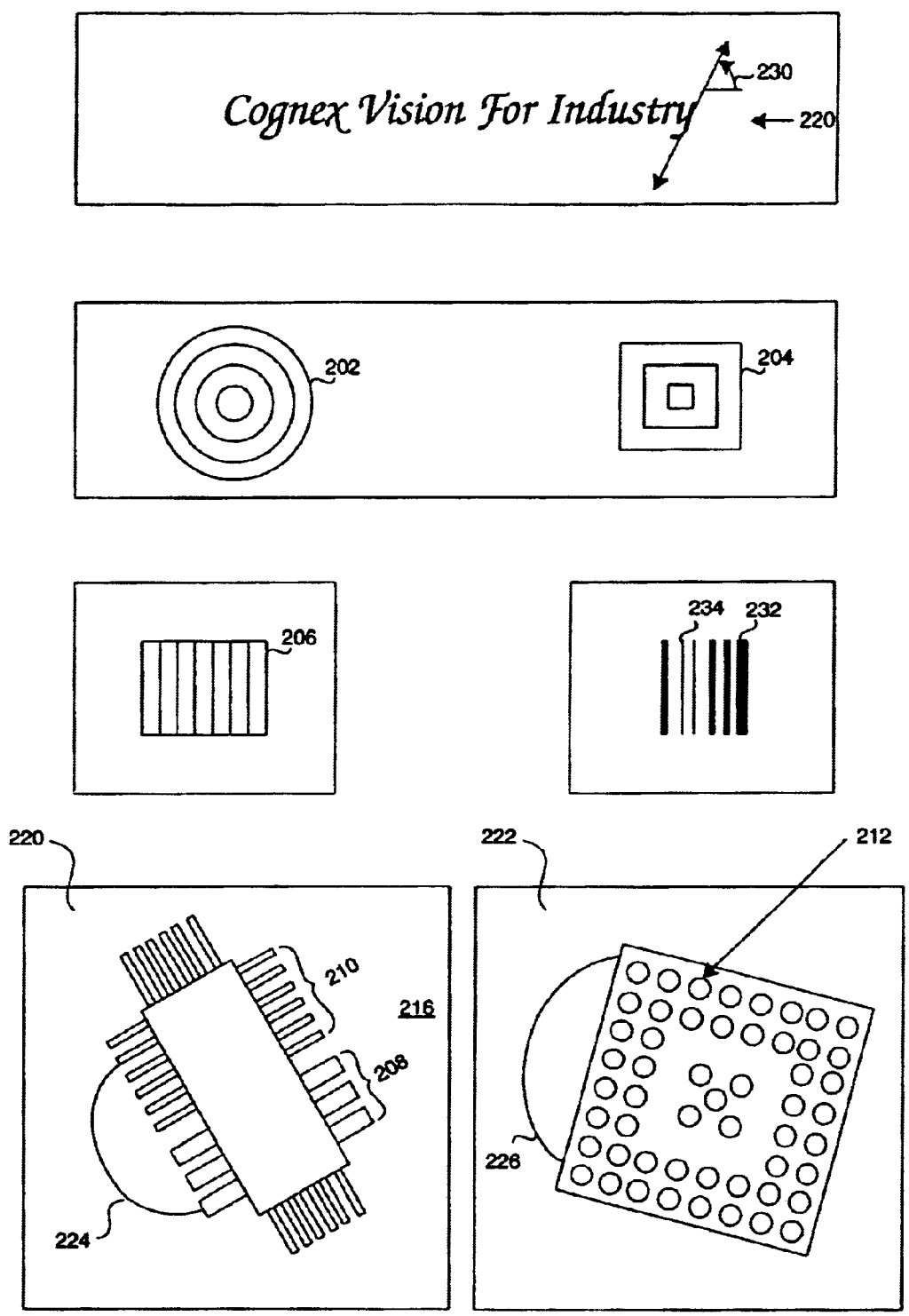
FIG. 2 depicts region(s) in images that exhibit similar texture.

An example of the effect of sub-region size on the analysis is illustrated using the bar code 232 of FIG. 2. A frequency spectrum of the bar code 232 produces multiple peaks, including, at least, a peak at the frequency associated with the thickness of the bar features 234, multiple peaks for the frequency associated with the spacing between the bars features 234, and a larger peak for the dominant frequency of the background. For smaller sub-regions, the strength of the frequency (i.e. the magnitude of the peak) due to one of the features 234 or a single spacing between features 234 is prominent. For larger sub-regions (approximately the size of the bar code 232), it is less likely multiple prominent peaks are present. Instead, a larger number of peaks of similar magnitude are present, which represent the various spacings and various widths of the features 234. The presence of prominent peaks, or lack thereof, aids identifying and segmenting of the entire bar code 232 and/or features 234 thereon.

Typically, the sub-regions overlay various features in the image, therefore, the frequency characteristic(s) calculated as hereinafter described, incorporate, in part, the frequency characteristic(s) of the neighboring region(s).

Returning to FIG. 3, optionally, the size of the sub-regions can be changed in an iterative process, denoted by path (308) to decrease the overlay or to save processing time, for example. For the first iteration, the image is divided into large sub-regions (302), the frequency characteristics of the large sub-regions are determined (304), and then intermediate regions of similar texture are hypothesized by examining the frequency characteristics from the large sub-regions (306). The frequency characteristics generated from the larger sub-regions, however, are coarse, and may not appropriately represent the sub-regions. Therefore, a more optimum size for the sub-regions is chosen using the intermediate regions, and the process is repeated (308) at the new smaller sub-region size.

The optimum size of a sub-region for each part of the image can differ. For instance, in large areas of the image that have substantially homogenous frequencies, analyzing larger sub-regions is better for processing efficiency and data requirements. Choosing an appropriate size to perform local operations is a common problem in image analysis. The solution is often provided by a pyramid scheme, such as the iteration procedure hereinbefore described. Other pyramid schemes, known in the art, can also be used without departing from the scope of the invention.

After the sub-regions are created, one or more frequency characteristic(s) are determined for each sub-region (304), where the frequency characteristics for a sub-region can include the dominant frequency, the power, the frequency spectrum, or the orientation of the analysis that produced the dominant frequency, for example. It should be apparent that any given sub-region can lack a given frequency characteristic.

In a preferred embodiment, the frequency analysis is conducted, within each sub-region, along a dominant orientation (304), such as the direction of arrow 414, which is aligned with the length of the rectangular sub-region 412, or the direction of the arrow 424, which is along the circumference of circular sub-region 422 in FIG. 4. In a preferred embodiment, the dominant orientation is generated using the methods and apparatuses described in co-pending U.S. Provisional Application, Serial No. 60/147,721 entitled, "Methods and Apparatuses For Determining the Orientation of at Least One Feature in an Image," which Provisional Application is filed on Aug. 6, 1999 in the names of Venkat Gopalakrishnan, Ivan Bachelder, and Albert Montillo, and which Provisional Application is hereby expressly incorporated by reference in its entirety.

Figure 5:
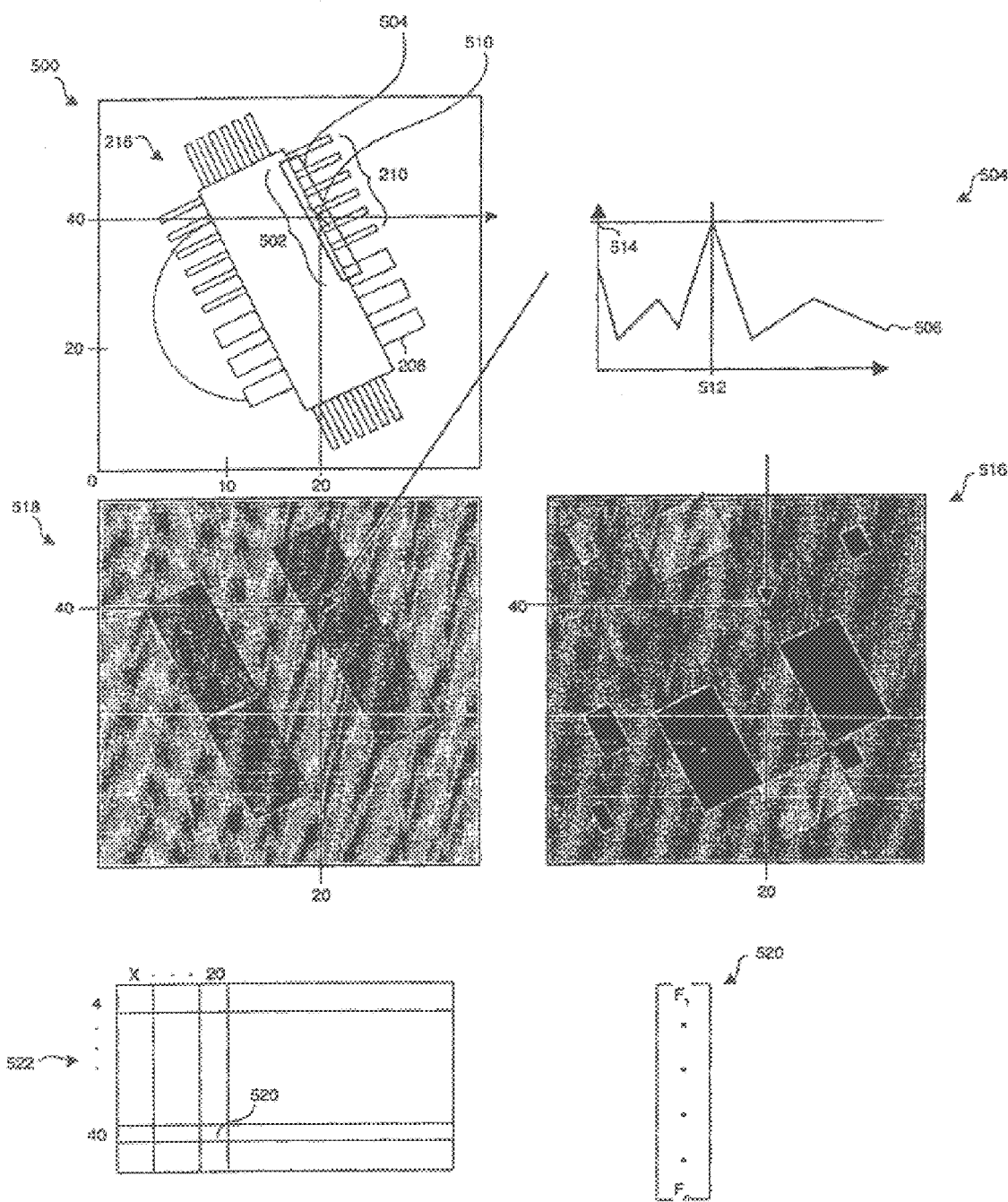
FIG. 5 depicts the operation of determining a frequency characteristic of one sub-region for one embodiment of the method of FIG. 3. Also shown are three aspects of a spatial frequency characteristic, and instances of how to store the three aspects.

The image data within the sub-region is input to a frequency algorithm, such as a Fourier series, Fourier transform, fast Fourier transform, Z transform, Laplace transform, or Taylor series, for example. An example of applying a one-dimensional fast Fourier transform ("1D FFT") along the length 502 of a sub-region 504 of an input image 500 of the leaded device 216 is shown in FIG. 5, not drawn to scale, where like numerals represent like elements. The input image 500 is represented as $I(x, y)$. The sub-region 504 has an origin 510 positioned at $I(20,40)$ in the input image 500. The 1D FFT of sub-region 504 generates a frequency spectrum 506, represented mathematically as FS($F_n$), shown on graph 508. The magnitude of the frequency is represented on the X-axis and the power represented on the Y-axis.

Next, a frequency characteristic(s) is associated with the origin 510, where the frequency characteristic is, for example, the maximum power 514 or the dominant frequency 512 of the sub-region 504, where the dominant frequency as used here means the magnitude of the frequency having the highest power in the frequency spectrum for that sub-region. Consequently, the frequency characteristic(s) for each sub-region is mapped into one point, or vector, that retains the spatial position of the sub-region.

The invention recognizes that frequency characteristic(s) of an image can be associated with their spatial position within the image by applying a frequency analysis on a sub-region of the image to generate a frequency characteristic(s) and associating that frequency characteristic(s) with the origin of the sub-region.

It should be apparent that any operation on the sub-region that generated a representation of the frequency of the sub-region can be used without departing from the scope of the invention, such as wavelet analysis, for example.

One or more frequency characteristic(s) are stored for each sub-region or for selected sub-regions.

The frequency characteristic(s) are preferably stored in an image(s), but can be stored in a data structure or other manner known in the art. For example, the dominant frequency 512 of sub-region 504 is stored in a frequency image 516, represented mathematically as F(x,y), at the same coordinates (20,40) as the origin 510 of the sub-region 504. It is preferred that the grey values in the frequency image 516 are mapped so that the low grey values represent low frequencies and high grey values represent high frequencies. It should be apparent that other mappings can be used, such as using the period, as opposed to the frequency, or mapping the high frequencies using the low grey values, and the low frequencies using the high grey values, for example. The maximum power 514 of the frequency spectrum 506 is also stored in an image, such as a power image 518, represented mathematically as P(x,y), at the same coordinates (20,40) as the origin 510 of the sub-region 504. The frequency image 516 and the power image 518 correspond one-to-one to the input image 500. It should be apparent that other ratios are possible, such as 5-to-1, for example.

In another embodiment, the entire frequency spectrum 506 for the sub-region 504 is stored as a vector 520 associated with the origin 510 (20, 40) of the input image 500 in a three-dimensional array depicted schematically in space 522. Each coefficient $\{F_1, F_2, \ldots F_n\}$ of the vector 520 is a term of the 1D FFT.

In a preferred embodiment, only the mid-range of the frequency spectrum is important for the analysis of the invention, the DC components, including background, and noise are filtered out of the frequency spectrum prior to generation, analysis, or storage, using techniques known in the art.

The next step is to examine neighboring sub-regions for at least one similar frequency characteristic (306), and, thereby, identify regions of similar texture. It should be apparent that neighboring sub-regions include regions that are not adjacent, such as the next closest sub-region, for example. Several methods can be used to identify the regions of similar texture using one or more of the frequency characteristics previously determined (i.e. dominant frequency, power, frequency spectrum, and statistics of regions in a given direction, for example).

Figure 6A:
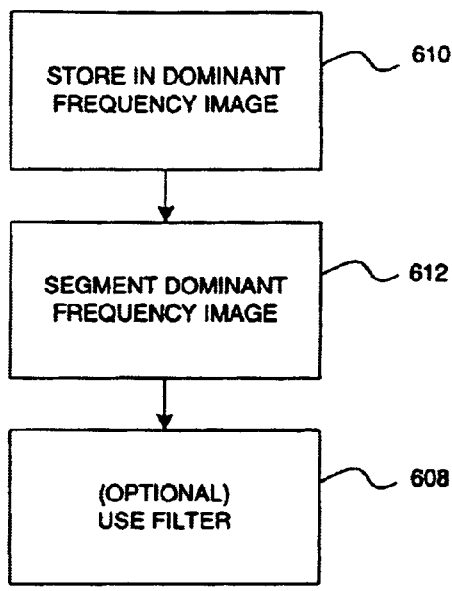
FIGS. 6A–6D are flowcharts detailing operation of four embodiments of the examining-the-sub-regions phase given the frequency characteristic(s) of FIG. 3.
Figure 6B:
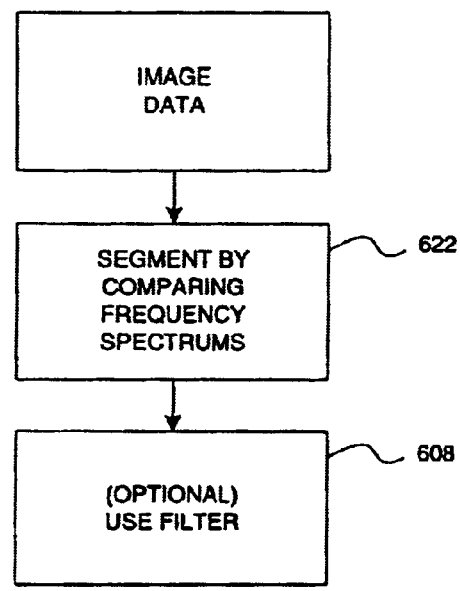

In one embodiment, regions of similar texture are defined by segmenting neighboring sub-regions with similar dominant frequencies, where similar dominant frequencies are dominant frequencies within a range of frequencies defined for each application. FIG. 6A is a flowchart detailing operation of a one embodiment of the examining neighboring-sub-regions phase using the dominant frequency, where steps of the method are denoted in the detailed description in parentheses.

First, the dominant frequency is stored in a frequency characteristic image (610), as previously described.

Next, the frequency characteristic image is segmented (612) into connected regions, using boundary tracking techniques, connectivity analysis, or other known techniques in the art, for example.

Figure 7:
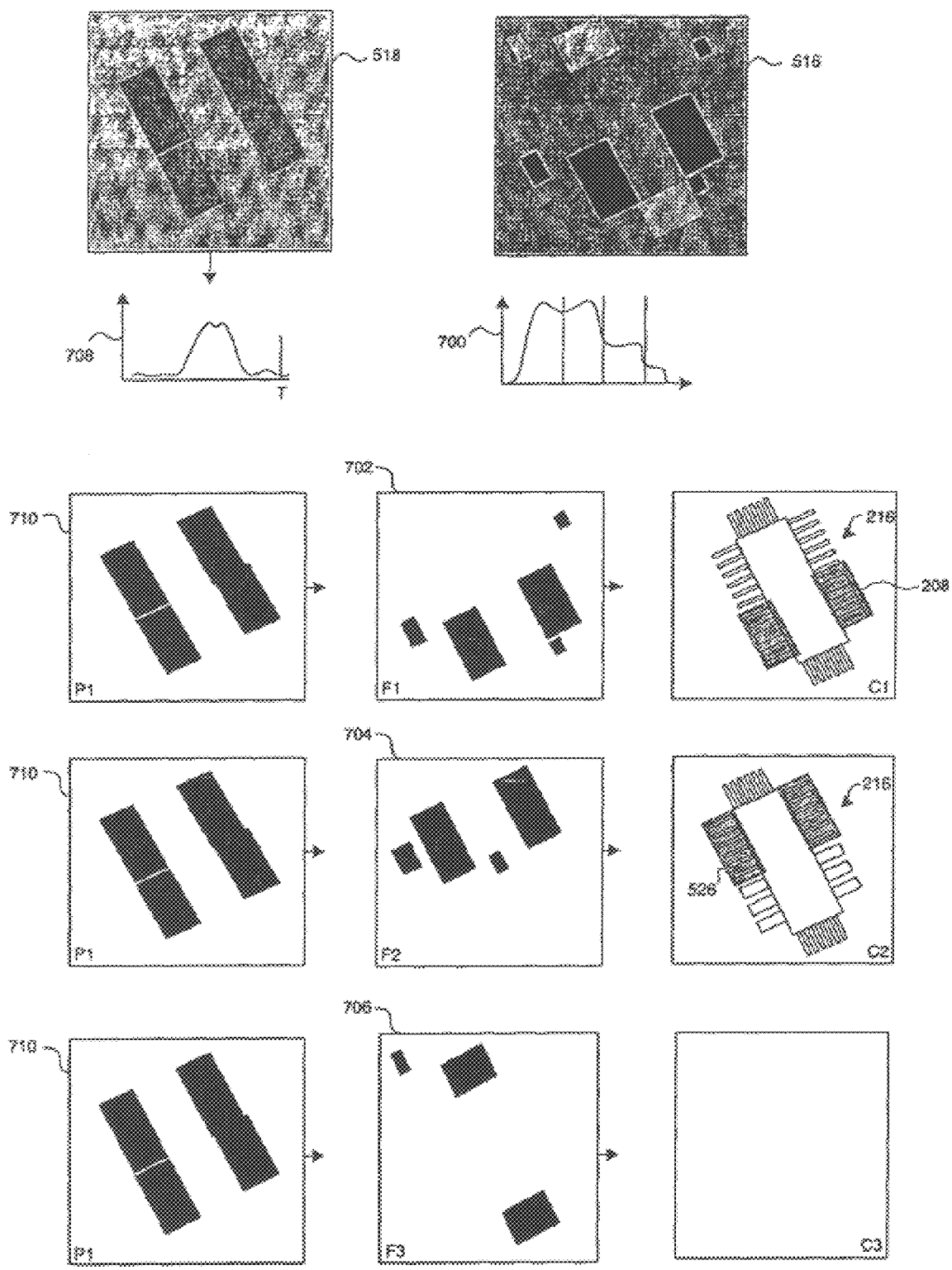
FIG. 7 depicts an instance of the operation of examining-the sub-regions phase of FIG. 3.

In a preferred embodiment, the segmentation is performed by thresholding the frequency characteristic image to form binary images. The threshold is determined using numerous methods known in the art. An example is illustrated in FIG. 7, not drawn to scale, where like numerals represent like elements. The threshold is found by first forming a histogram 700 of the dominant frequency image 516, simplified for illustration purposes, where the grey-scale value is graphed on the abscissa and the number of pixels having the grey-scale value is represented on the ordinate. Thus, the histogram is a one-dimensional function that represents the grey-scale values in the dominant frequency image. In this example, the histogram 700 of the dominant frequency image 516 has three thresholds, $T_1$, $T_2$, and $T_3$. The thresholds are used to make binary images. More particularly, the first binary image 702, denoted F1(x,y), is created by setting the grey-scale value to zero for all pixels of the dominant frequency image 516, F(x,y), that have a grey-scale value below $T_1$, and setting the grey-scale values of all other pixels to 255. Similarly, the second binary image 704, denoted F2(x,y), is created by setting the grey-scale value of all pixels of F(x,y) 516 having a grey-scale value above $T_1$ and below $T_2$ to zero, and setting the grey-scale value of all other pixels to 255. A third binary image 706, denoted F3(x,y), is created by setting the grey-scale value of all pixels of F(x,y) 516 having a grey level above $T_2$ and below $T_3$ to zero, and setting all other pixel grey-scale values to 255. The regions remaining in the binary images 702, 704, and 706 are regions of similar texture. Further, the regions within each of the binary images 702, 704, and 706 have similar texture to each other.

Next, optionally the binary images 702, 704, and 706 are filtered (608) to remove unwanted features, thereby, further identifying the leads 208 and 210 from other regions of similar texture. Many different filters can be used without departing from the scope of the invention, where the filters use characteristics of wanted and unwanted features to remove extraneous regions from the binary images. For instance, if the background was previously removed by filtering out the DC component, an area threshold value is used to remove a peak for the background (not shown in the histogram 708). For example, noise is removed from the binary images 702, 704, and 706 by discarding any regions having an area below an area-threshold value. In addition, regions formed from non-repetitive features, such as nozzles, for example, are optionally removed from the binary images 702, 704, and 706 because they are below an area-threshold value or are a certain shape, for example.

Alternately, in one embodiment, regions of similar texture are defined by finding sub-regions with similar frequency spectrums (306), as further described with reference to FIG.

6B, where the steps of the method will be denoted in the detailed description in parentheses. "Similar frequency spectrum" is defined for each application, where similarity can be defined by pattern recognition techniques, clustering techniques, such as neural networks, or other techniques known in the art. For instance, the value of a standard deviation between the frequency spectrums of two neighboring sub-regions can define similarity.

In this embodiment, no frequency characteristic image is created.

Instead, the input image is segmented (622) by comparing the frequency spectrum data of neighboring sub-regions. Frequency spectrums can also be compared for similarity not only between neighboring sub-regions, but also across a group of neighbors, such as four or five neighboring sub-regions. Either an average change in the standard deviation, or the maximum change in the standard deviation, across the group of neighbors, can define similarity. One skilled in the art should realize that measures other than standard deviation could be used when comparing sub-regions, such as gradients between two frequency characteristics or portions thereof, for example, without departing from the scope of the invention.

Figure 8:
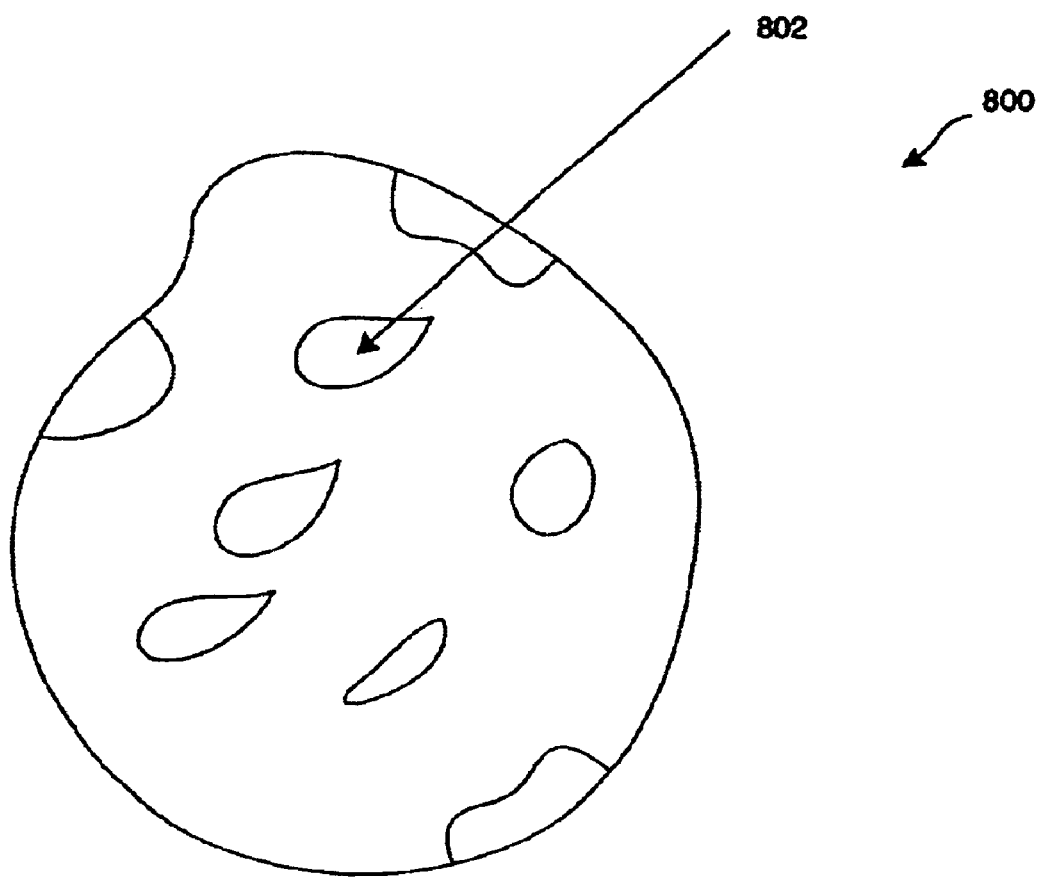
FIG. 8 illustrates an example of a region that lends itself to being identified using the entire frequency spectrum characteristic.

Comparing frequency spectrums between sub-regions is a more stable comparison than the prior example of comparing dominant frequencies using segmentation. It is more stable because the entire frequency spectrum is compared to define a region as opposed to defining a region from comparing one value of the frequency spectrum, the dominant frequency, of each sub-region. Changes in one value, the dominant frequency, may improperly create a new region, while changes in one value in the midst of many-unchanging values in the frequency spectrum, allows the noise to be ignored. FIG. 8 illustrates an example of a region 800 where comparing the frequency spectrums is a preferred method of identifying the region 800, which has many inconsequential breaks 802, exaggerated for illustration purposes.

Lastly, extraneous regions are optionally removed using filters, as previously described, or by using other vision techniques known in the art (608).

Figure 6C:
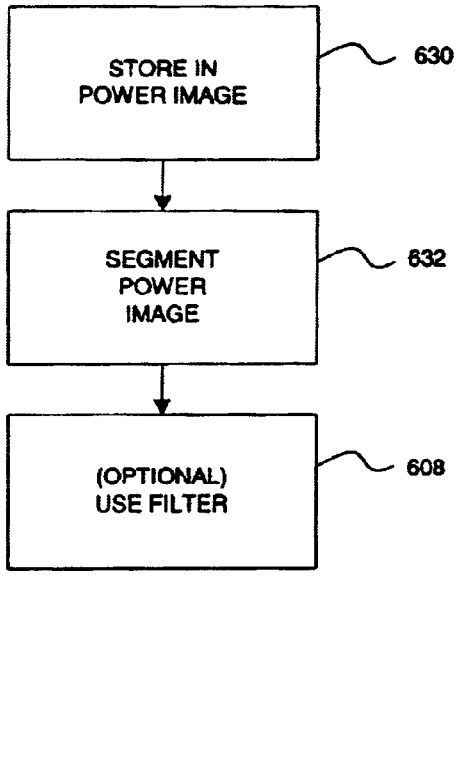

Another embodiment that uses only the power frequency characteristic is described with reference to FIG. 6C, where steps of the method are denoted in the detailed description in parentheses. This embodiment is suited to process an image having one region of similar texture, other than the background, such as in the bar code application. First, the power characteristic(s) are stored in a power image (630). The region is segmented from the power image (632) using the connectivity analysis. previously described or techniques known in the art. Preferably, the region is segmented by thresholding, as previously described, and a binary image is created that includes regions of similar power. Optionally, extraneous regions are removed using filters, as previously described, or by using other vision techniques known in the art (608).

Regardless of how the regions are found, typically, the boundaries of the regions are rough because usually the image within the sub-region contains features that create more than one frequency. As illustrated using the leaded device 216 of FIG. 5, as the sub-region 504 is placed more over the wide leads 208 and less over the narrower leads 210, the dominant frequency peak 512 of the frequency spectrum 506 will shift from peak 512 to a second peak to the right of peak 512. The shift is not abrupt, but gradual as the sub-region 504 increasingly begins to overlay the wide leads 208. Therefore, the boundary of the regions for the smaller-width leads 210 and the wider leads 208 is not sharp.

In a preferred embodiment, the regions are further refined by using more than one frequency characteristic to define a region as described with reference to FIG. 6D, where steps of the method are denoted in the detailed description in parentheses. The region is identified by combining more than one frequency characteristic image using logic, such as ANDing (604), where the region is the area that is common to all the combined frequency characteristic images.

Figure 6D:
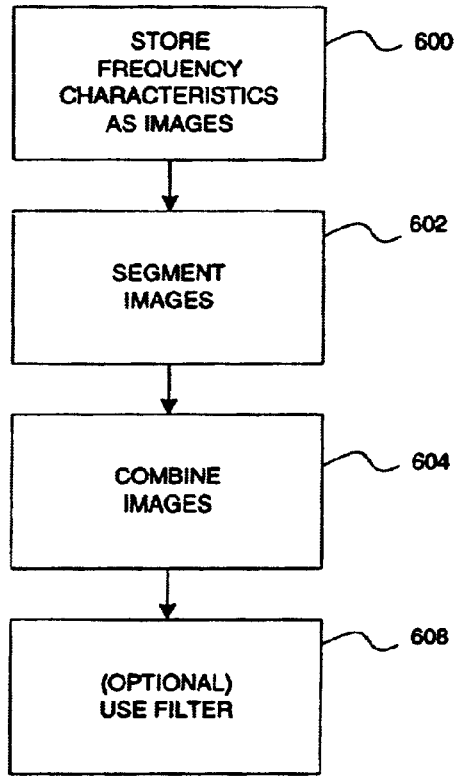

An example of a preferred embodiment of combining sub-regions is described with continuing reference to FIG. 6D and with reference to FIG. 7, not drawn to scale, where like numerals designate like elements. First, the frequency characteristic images are stored (600) and segmented by thresholding to form binary images (602). In the example, the dominant frequency image 516 is threshold to form binary image(s), 702, 704, and 706, as previously described. The power image 518 is also thresholded, and creates one binary image 710. The regions within the binary image 710 all have similar power. The next step is to optionally combine the power image, designated mathematically as $P1(x,y)$, and the dominant frequency images $F1(x,y)$, $F2(x,y)$, and $F3(x,y)$ (604). The images are combined by logically ANDing the power image, $P1(x,y)$, with each of the dominant frequency images, $F1(x,y)$, $F2(x,y)$, and $F3(x,y)$, in turn, to created a combined frequency characteristic image, $C1(x,y)$, $C2(x,y)$, and $C3(x,y)$, respectively. $C1(x,y)$ has two regions remaining, shown superimposed over the wide leads 208 of the leaded device 216. $C2(x,y)$ has two regions remaining, shown superimposed over the smaller leads 210 of the leaded device 216. $C3(x,y)$ is a null image.

The combined images C1, C2, and C3 only contain non-null pixels that are present in both the underlying binary power image, $P1(x,y)$ and corresponding binary dominant frequency image $F1(x,y)$, $F2(x,y)$, and $F3(x,y)$, respectively. Thus, unrepresentative frequency characteristic values that were present in the frequency characteristic images optimally are removed from the combined images. Thus, the definitions of the regions are refined to be more exact and, therefore, more accurately represent regions that have a similar texture.

The background is removed by the area-threshold value (608) or the filtering of the signal previously described.

Optionally, additional unwanted regions are removed using a connectivity analysis or other filtering techniques previously described or known in the art (608).

Figure 12:
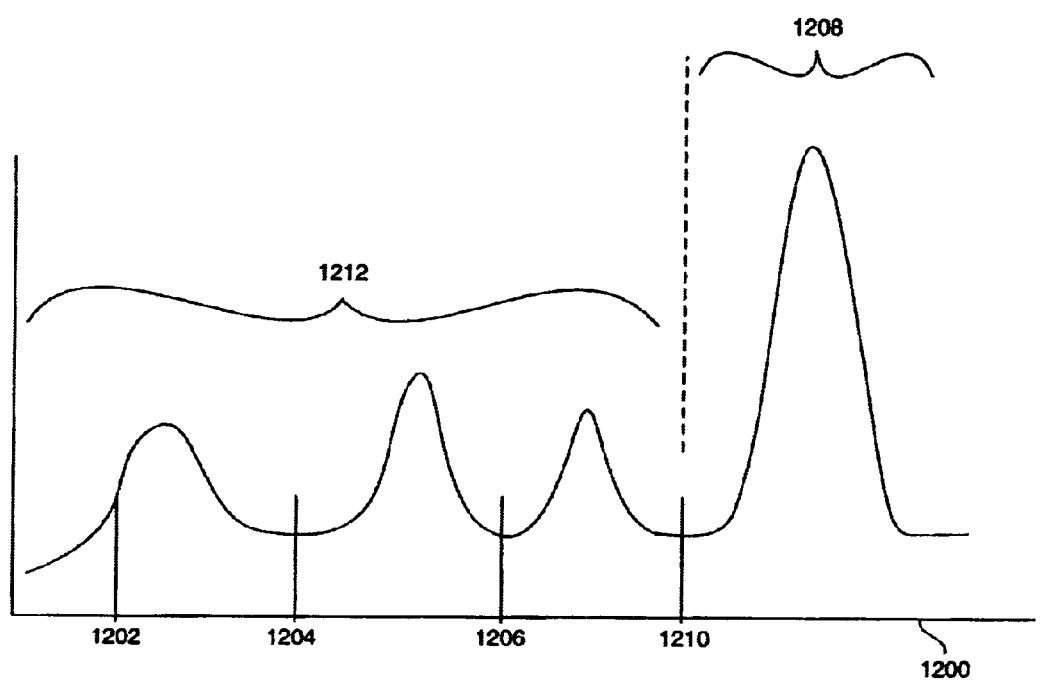
FIG. 12 depicts a histogram of the bar code of FIG. 2.

When thresholding is employed to segment the images, the choice of the refinement of the threshold value determines what values are similar, whether it is a similar dominant frequency, similar power, or other similar frequency characteristic. For instance, to identify the bar code 232 of FIG. 2, a typical histogram of a dominant frequency image is shown in FIG. 12, not drawn to scale. If the threshold values are chosen to create fine distinctions on the grey-scale axis 1200, such as at grey values 1202, 1204, and 1206, the lines features 234 of the bar code 232 will not be interpreted as having the same dominant frequency. With this fine thresholding scheme, the line features 234 of the bar code 232 are distinguished from one another. On the other hand, a coarser thresholding scheme, such as the threshold value chosen at the grey value of 1210, for example, would identify the bar code features 234 as a region having a similar texture, and the bar code region 1212 is segmented from the background region 1208. The bar code region could then be input into other image processing algorithms.

Figure 9:
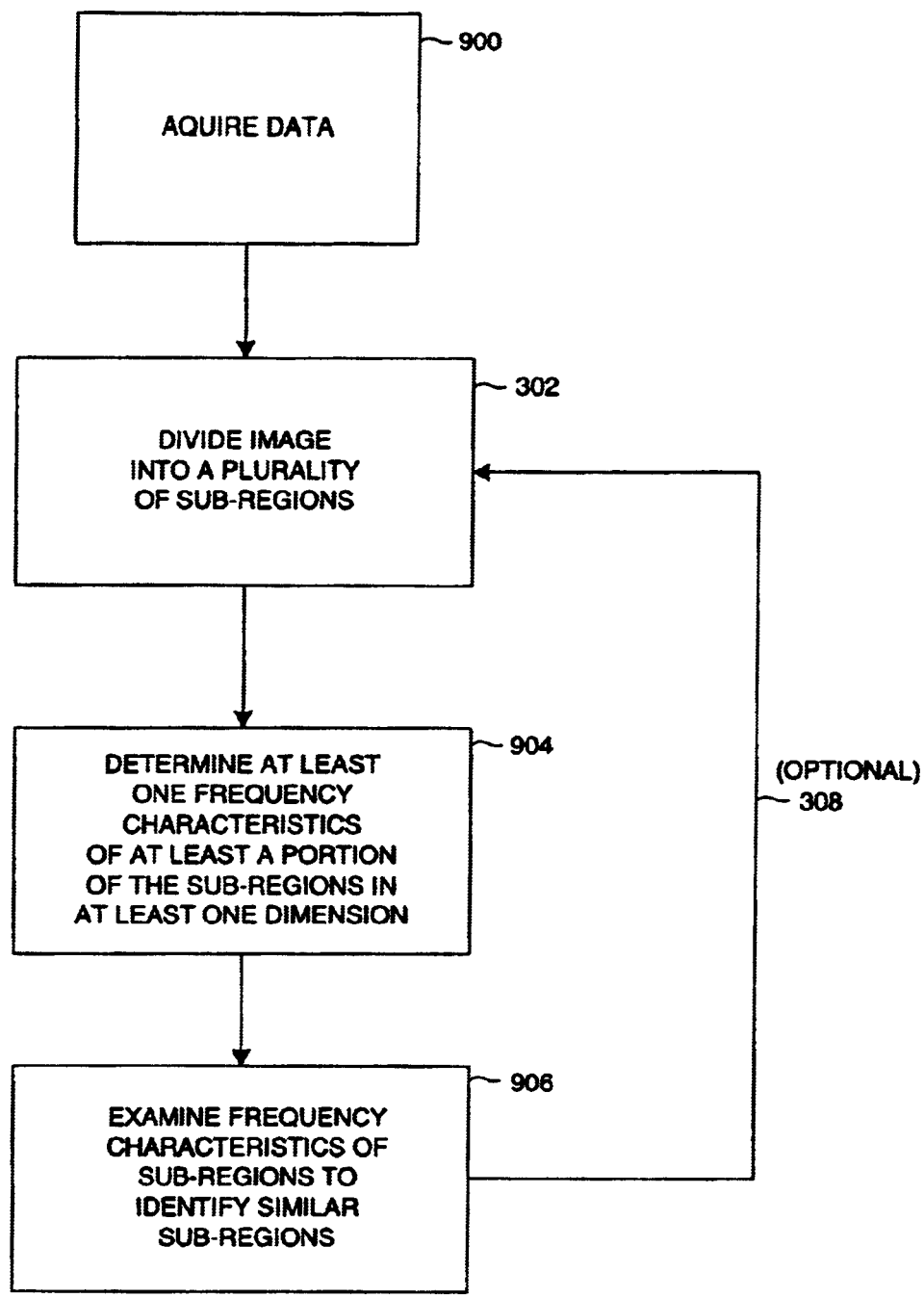
FIG. 9 is a flowchart summarizing the operation of an embodiment of a method according to the invention that identifies regions of similar texture in an image.

Turning to FIG. 9, which shows an alternate embodiment of the method of the invention that does not require a given direction in which to perform the frequency analysis, where steps of the method are denoted in the detailed description in parentheses. The first step is to acquire data (900). The data can be in the form of an image, as described earlier, or other data can be processed by the invention, such as a video stream for example.

Although the preferred embodiment analyzed frequency over space (i.e. a spatial frequency analysis), the frequency analysis can be made over time, and, thus used to detect movement, or changes, over a sequence of process steps, for example. For instance, regions of a video stream are identified in time, where the background is a region of similar texture having a low dominant frequency over time, and where moving parts create a region of similar texture having higher dominant frequencies over time. Such an implementation should be apparent to one skilled in the art when using the teachings herein and elements known in the art.

Next, the data is divided into sub-regions (302).

Figure 10:
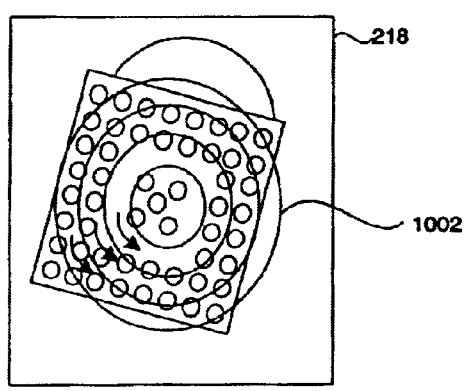
FIG. 10 depicts examples of sub-regions that may be used when an orientation of the region is unknown.
Figure 10:
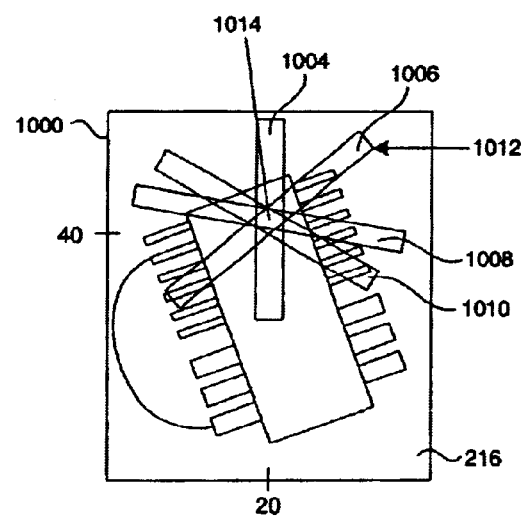

Next, unlike the previous embodiment, the frequency analysis does not require a known direction (904). A spatial frequency analysis is conducted using a non-angle dependent method. For example, on FIG. 10, not drawn to scale, a non-angle dependent analysis sums, in the direction of the circumference, the pixels within two-dimensional annular rings 1002 to generate a one-dimensional signal that is input into the 1D FFT (904).

Alternatively, the angle is determined first and then the frequency characteristics are processed at that angle, as previously described (904) or the angle information is determined for a plurality of angles and combined with the respective frequency characteristics for each angle. For example, the angle(s) are found by conducting the frequency analysis along the length of each rectangular sub-region 1012 in image 1000 of the leaded device 216 at the angles 1004, 1006, 1008, and 1010, for example. The angle 1004, 1006, 1008, and 1010 of the sub-region 1012 that generated the maximum power is stored for the origin 1014 of the sub-region 1012, given here as position (20, 40), where the angle chosen is designated as β.

Figure 11:
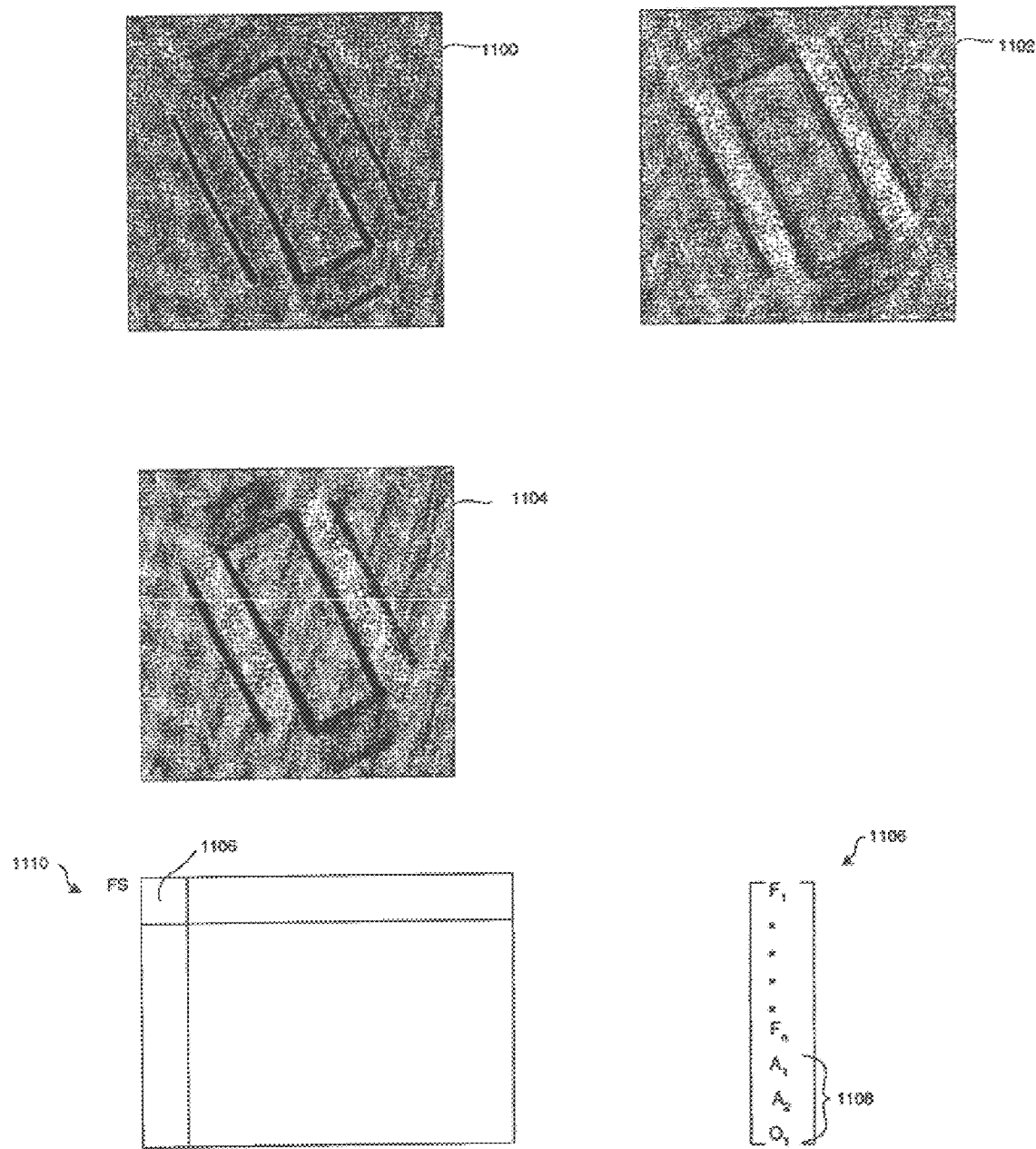
FIG. 11 shows three instances of how to store the frequency characteristic of angle.

FIG. 11 depicts several ways of storing β. The β for each origin 1014 of the sub-regions is stored directly in an angle image 1104, denoted $\{\beta(i,j)|0<\beta \leq 360°\}$. Alternately, a dx-image 1100 and dy-image 1102 store a component of β, where $\{dx(i,j)=\cos \beta|-1 \leq dx \leq 1\}$ and $\{dy(i,j)=\sin \beta|-1 \leq dy \leq 1\}$. Alternatively, the angle information 1108 is appended to a vector 1106 containing other frequency characteristic information for each origin, where the vector 1106 can contain the any combination of the frequency characteristics, such as the frequency spectrum, denoted $F_1$. $F_n$, the dx and dy angle components, denoted $a_1$ and $a_2$, and other information denoted $0_1$. The vector 1106 is stored, as previously described, in the three-dimensional array 1110 where each position FS(i,j) of the array contains its own vector 1106.

Preferably, the angle data is stored in an image, which is segmented by thresholding to generate binary angle images, each of the binary angle images having regions therein where the angle that produced the maximum power is similar.

Next, the other frequency characteristics are generated at one or more of the angles remaining in the binary angle image(s) (904).

Again, several methods can be used to examine the frequency characteristics and identify the sub-regions (906). For instance, if the image contained two lead sets at different orientations, such as in a four-sided leaded device, the angle image is used alone, without other frequency characteristics, to find:and distinguish these regions, similarly to the embodiment described with reference to FIG. 6A and 6C. Alternatively, the angle image is combined with the frequency characteristics calculated at that angle by logically ANDing the angle image with other frequency characteristic images, similarly to the embodiment previously described with reference to FIG. 6D. Lastly, any extraneous regions are optionally removed using an appropriate filter (608), as previously described. It should be apparent that the filtering can occur earlier in the process.

It should also be apparent that although an image was used as a preferred embodiment of the operation of examining the neighboring sub-regions, other data formats can be used, such as a data structure, for example.

It should be apparent that the dominant frequency can be redefined according to the application to be a frequency having a power characteristic other than the highest or one of the highest power values in the frequency spectrum.

It should be apparent that instead of using the same sub-regions for both the angle search and the frequency analysis, larger sub-regions can be used to determine the appropriate angle at which to analyze the remaining frequency characteristics, and then the frequency analysis can be applied at that angle on smaller sub-regions.

Those skilled in the art will appreciate that some, or all, of the steps of, dividing, determining at least one frequency characteristic, thresholding, ANDing, and filtering, described hereinbefore, can be combined and effected as hardware implementations, software implementations, or a combination thereof.

Additionally, while two or more aligned frequency characteristic images, (e.g. the power image, the dominant frequency image, and/or the angle image(s)) are described herein as being effectively combined by optionally ANDing one to the other, it should be appreciated that analogs of the power, frequency, and angle images, such as filtered or re-mapped images can be processed and combined to yield the combined image.

Furthermore, it should be appreciated that any of the images described herein can be subject to further processing, such as by filtering using a gaussian filter, median filter, smoothing filter, morphological filter, or the like known in the art, in order to improve image quality.

Although in the methods and apparatuses described hereinbefore, frequency characteristic images are described as logically ANDed with each other, it will be appreciated that other means of combining the images can be effected, such as fuzzy logic, to arrive at a combined image or an image representative of the logically combined images.

Those skilled in the art will also realize that processing time can be decreased by using reduced-resolution images or any combination of full-resolution and reduced-resolution images. However, use of reduced-resolution images typically results in a loss of accuracy.

Those skilled in the art will realize that processing time can also be decreased by performing any of the computations described herein using sampled data, such as determining frequency characteristics of sub-regions from sampled data, for example. Sampled data is a subset of the available data points, such as every third data point or every third sub-region, for instance.

Those skilled in the art will realize that the features do not have to be part of one object but can be separate objects.

Although the invention has been shown and described with respect to exemplary embodiments thereof, various other changes, omissions and additions in the form and detail thereof may be made therein without departing from the spirit and scope of the invention. Accordingly, the above description is not intended to limit the invention except as indicated in the following claims.

What we claim is:

1. A method for identifying regions of similar texture in at least one input image, the method comprising:

acquiring image data representing the at least one input image;

dividing at least a portion of the image data into sub-regions, each of the sub-regions having an origin, and a length;

applying a one dimensional spatial frequency analysis along the length of each of the sub-regions so as to produce a frequency characteristic for each of the sub-regions and associating the frequency characteristic of each sub-region with its origin; and examining the frequency characteristic of each of the sub-regions to identify similar sub-regions, thereby identifying regions of similar texture in the input image, wherein the frequency characteristic is the frequency spectrum of each sub-region along the length.

2. The method of claim 1, wherein the regions of similar texture are regions of homogeneous texture.

3. The method of claim 1, wherein the image data is an input image.

4. The method of claim 1, wherein the sub-regions overlap.

5. The method of claim 1, wherein the origins of the sub-regions are at regular intervals along at least a single dimension within the at least one input image.

6. The method of claim 1, where the origins of the sub-regions correspond with every pixel location in the at least one input image.

7. The method of claim 1, wherein each of the sub-regions is the same size.

8. The method of claim 1, wherein the determining a frequency characteristic further includes:

performing a one-dimensional Fourier analysis along the length of each of the sub-regions so as to determine the frequency characteristic of each of the sub-regions.

9. The method of claim 1, wherein the examining the frequency characteristic of each of the sub-regions further includes:

comparing the frequency characteristic of neighboring sub-regions so as to identify the similar sub-regions.

10. The method of claim 9, wherein the comparing further includes:

comparing the frequency characteristic of the neighboring sub-regions using a similarity metric so as to determine the similar sub-regions.

11. The method of claim 9, wherein the neighboring sub-regions are adjacent sub-regions.

12. The method of claim 1, wherein the examining the frequency characteristic further includes:

representing the frequency characteristic of each of the sub-regions as a value on a frequency-characteristic image at the respective origin of each of the sub-regions;

segmenting the similar sub-regions within the frequency-characteristic image using the values of the sub-regions.

13. The method of claim 12, wherein the segmenting further includes:

thresholding the values within the frequency-characteristic image to form binary images, each of the binary images containing only a background and at least one region of similar texture.

14. The method of claim 12, wherein representing the frequency characteristic further includes:

representing the frequency characteristic of each of the sub-regions as a grey-scale value on the frequency-characteristic image at the respective origin of each of the sub-regions; and wherein the segmenting further includes:

segmenting the similar sub-regions within the frequency-characteristic image using the grey-scale values of the sub-regions.

15. The method of claim 1, wherein the examining the frequency characteristic of each of the sub-regions further includes:

representing a plurality of the frequency characteristics of each of the sub-regions as respective values on a plurality of frequency-characteristic images at the respective origin of each of the sub-regions;

segmenting the similar sub-regions within the plurality of frequency-characteristic images using the values, thereby identifying the similar sub-regions in each of the respective frequency characteristic images.

16. The method of claim 1, wherein determining the frequency characteristic includes, performing a one-dimensional spatial frequency analysis in substantially one orientation to determine at least a portion of a frequency spectrum of each of the sub-regions, the at least a portion of the frequency spectrum of each of the sub-regions providing the frequency characteristic of each of the sub-regions, and wherein examining the frequency characteristic includes, examining the at least a portion of the frequency spectrum of each of the sub-regions to identify the similar sub-regions.

17. The method of claim 16, wherein examining the at least a portion of the frequency spectrum includes, examining a mid-range of the frequency spectrum of each of the sub-regions.

18. The method of claim 16, wherein examining the at least a portion of the frequency spectrum includes, examining a standard deviation of the at least a portion of the frequency spectrum of each of the sub-regions to identify the similar sub-regions.

19. The method of claim 16, wherein the at least a portion of the frequency spectrum include terms derived from a transform analysis.

20. An apparatus for identifying regions of similar texture in at least one input image, the at least one input image having sub-regions, each of the sub-regions having an origin, and a length, the apparatus comprising:

frequency-characteristic means, adapted to apply a one dimensional spatial frequency analysis to determine a frequency characteristic, along the length of each of the sub-regions and associating the frequency characteristic of each sub-region with its origin; and examination means, in communication with the frequency-characteristic means, adapted to identify similar sub-regions using the frequency characteristic of each of the sub-regions, wherein the frequency characteristic is the frequency spectrum of each sub-region along the length.

21. The apparatus of claim 20, wherein the similar sub-regions are sub-regions of portions of leads of a leaded device.

22. The apparatus of claim 20, wherein the similar sub-regions are sub-regions of portions of balls of a ball grid array device.

23. The apparatus of claim 20, wherein the frequency characteristic means further includes:
analysis means adapted to performing a one-dimensional spatial frequency analysis in substantially one orientation on each of the sub-regions so as to determine the frequency characteristic of each of the sub-regions.

24. The apparatus of claim 23, wherein the frequency characteristic is at least a portion of a frequency spectrum of each of the sub-regions, and wherein the examining means is further adapted to examine the at least a portion of the frequency spectrum of each of the sub-regions to identify the similar sub-regions.

25. The apparatus of claim 24, wherein the at least a portion of the frequency spectrum is a mid-range of the frequency spectrum of each of the sub-regions.

26. The apparatus of claim 24, wherein the examining means is further adapted to examine a standard deviation of the at least a portion of the frequency spectrum of each of the sub-regions to identify the similar sub-regions.

27. The apparatus of claim 24, wherein the at least a portion of the frequency spectrum include terms derived from a transform analysis.

28. The apparatus of claim 20, wherein the examination means further includes:
comparison means, in communication with the frequency means, adapted to compare the frequency characteristic of each of the sub-regions so as to identify the similar sub-regions.

29. The apparatus of claim 20, further comprising:
frequency-characteristic images, in communication with the frequency-characteristic means, adapted to receive a value of the frequency characteristic of each of the sub-regions at the respective origin position of each of the sub-regions; and
wherein the examination means further includes:
segmenting means, adapted to segment the similar sub-regions within the frequency-characteristic images using the values of the sub-regions.

30. A method for identifying regions of similar texture in at least one input image of a surface-mount device, the method comprising:
acquiring image data representing the at least one input image of the surface-mount device;
dividing at least a portion of the image data into sub-regions, each of the sub-regions having an origin, and a length;
determining a frequency characteristic by applying a one-dimensional spatial frequency analysis along the length of each of the sub-regions and associating the frequency characteristic of each sub-region with its origin; and
identifying a sub-set of the sub-regions having similar frequency characteristics, thereby identifying regions of similar texture in the at least one input image, the regions containing at least portions of features of the surface-mount device, wherein the frequency characteristic is the frequency spectrum of each sub-region along the length.

31. The method of claim 30, wherein the determining the frequency characteristics further includes:
performing a one-dimensional spatial frequency analysis in substantially one orientation on each of the sub-regions to determine the frequency characteristic of each of the sub-regions.

32. The method of claim 30, wherein the identifying the sub-set of the sub-regions having similar frequency characteristics further includes:
identifying neighboring sub-regions having similar frequency characteristics.

33. The method of claim 30, wherein the identifying the sub-set of the sub-regions further includes:
representing a plurality of the frequency characteristics of each of the sub-regions as respective values on a plurality of frequency-characteristic images at the respective origin of each of the sub-regions; and
segmenting the sub-set of the sub-regions having similar frequency characteristics within each of the plurality of frequency-characteristic images using the values.

34. The method of claim 30, wherein determining the frequency characteristic includes,
performing a one-dimensional spatial frequency analysis in substantially one orientation to determine at least a portion of a frequency spectrum of each of the sub-regions, the at least a portion of the frequency spectrum of each of the sub-regions providing the frequency characteristic of each of the sub-regions, and
wherein identifying the subset of the sub-regions includes,
identifying the subset of the sub-regions having similar portions of the respective frequency spectrums.

35. The method of claim 34, wherein identifying the sub-set of the sub-regions includes,
examining a mid-range of the frequency spectrum of each of the sub-regions.

36. The method of claim 34, wherein identifying the subset of the sub-regions includes,
examining a standard deviation of the at least a portion of the frequency spectrum of each of the sub-regions to identify the subset of the sub-regions having similar frequency spectrums.

37. The method of claim 34, wherein the at least a portion of the frequency spectrum include terms derived from a transform analysis.

38. A method for identifying regions of similar texture in at least one input image, the method comprising:
acquiring image data representing the at least one input image;
dividing at least a portion of the image data into sub-regions, each of the sub-regions having an origin;
applying a Fourier analysis, in substantially one orientation, of each of the sub-regions so as to produce a frequency characteristic for each of the sub-regions;
examining the frequency characteristic of each of the sub-regions to identify similar sub-regions thereby identifying regions of similar texture in the input image; individually optimizing the size of each sub-region to ensure that a substantially homogenous texture is contained therein, based on the frequency characteristic of the given sub-region; and
repeating the steps of applying and examining.

* * * * *